Feb. 16, 1954  R. L. GARMAN ET AL  2,669,121
SUPERSONIC FLOW METER

Filed Dec. 2, 1948

RAYMOND L. GARMAN
MARCEL E. DROZ
JOHN W. GRAY
Inventor

By

*H. A. Mackey*
Attorney

Patented Feb. 16, 1954

2,669,121

UNITED STATES PATENT OFFICE 2,669,121

SUPERSONIC FLOW METER

Raymond L. Garman and Marcel E. Droz, Pleasantville, and John W. Gray, White Plains, N. Y., assignors to General Precision Laboratory Incorporated, a corporation of New York Application December 2, 1948, Serial No. 63,122

9 Claims. (Cl. 73—194)

1

This invention relates to a flow meter of the sonic type wherein the time required for sound waves to travel through a fluid in motion is utilized to determine the velocity of the fluid.

A purpose of the invention resides in the provision of such apparatus that the velocity of fluid in a conduit may be determined directly, the indication obtained being independent of the velocity of sound in the fluid. Different fluids transmit sound at different velocities and the velocity of travel through any particular fluid varies with temperature so that by providing a device whose measured output is independent of such a variable, the necessity for recalibration and the allowance for temperature errors are avoided.

When a sound wave is transmitted through a fluid a certain time is required for such transmission which is dependent on the velocity of sound in the fluid, the length of the path over which the sound is transmitted and the velocity of the fluid itself, the velocity of the fluid either adding to or subtracting from the transmission time depending on whether the sound is transmitted against or with the stream of flow.

In the instant invention the time required for such transmission is determined by the use of a feedback circuit which produces a signal whose frequency of repetition varies in accordance with the time required for the sound waves to travel over a predetermined path in the fluid.

Specifically a signal is generated by an oscillator or similar device which energizes a supersonic transmitter located in the fluid path causing a sound wave to be transmitted therethrough. This signal is picked up by a receiver located at a fixed predetermined distance from the transmitter and the received signal utilized to energize the oscillator so that the frequency of repetition of the signals generated by the oscillator depends directly on the time required for transmission.

This time of transmission and hence the repetition frequency of the generated signals, without more, will depend on two variables, the velocity of the fluid which is desired to be determined, and the velocity of sound through the fluid, the effects of which are undesirable.

In order that the velocity of the sound may be eliminated from the final indicating instrumentality, two feedback paths are utilized, one of which passes supersonic sound through the fluid in the general direction of the fluid flow and the other of which passes supersonic sound through the fluid in a direction generally opposite to the

2 flow. In such an arrangement each separate path will generate a signal of a different repetition frequency. The frequency of the signal in one path will be greater than the mean by an amount which is proportional to the velocity of the fluid and the frequency of the signal in the other will be less than the mean by a like amount. Signals are derived from both paths and their difference, varying only as the velocity of the fluid, used to provide the desired indication.

This invetnion will be more clearly understood by reference to the following description when taken together with the accompanying drawing, in which.

Figure 1:
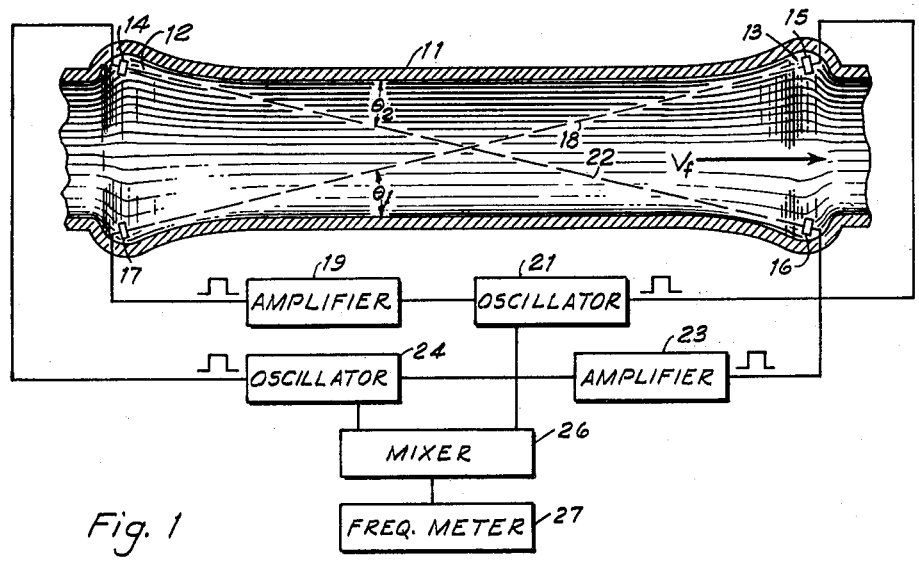
Figure 1 is a diagrammatic illustration of a system employing the invention.

Referring now to Fig. 1 a section of pipe 11 of suitable diameter and length is inserted in the fluid line, the velocity of the fluid of which is to be measured. This section may be fastened to the fluid line in any desirable manner as by flanged coupling or the like, the particular coupling being not shown herein as it forms no part of the present invention.

At suitable spaced distances the pipe section 11 is formed with recesses or wells 12 and 13 in which are inserted crystal or magnetostrictive transducers 14, 15, 16 and 17, or other like transducers, the wells being provided so that the transducers are out of the direct path of fluid flow and turbulence thereby reduced.

The transducer 15 acts as a transmitter to convert electrical pulses to supersonic sound impulses which are transmitted along the path indicated by the dotted line 18 to the transducer 17. The transducer 17 in turn constitutes the receiver and converts the supersonic sound impulses into an electrical signal which is applied to the input of an amplifier 19. The output of the amplifier 19 is connected to the input of an oscillator or impulse regenerator 21 and the signal received by the transducer 17 and amplified by the amplifier 19 acts to trigger the oscillator 21 causing it to generate another pulse signal in a manner described hereinafter.

Inasmuch as the time required for the signal to travel through the electrical path, that is from the receiver 17 to the transmitter 15 is for all intents and purposes instantaneous, pulses are generated by the oscillator 21 at time intervals which are a function of the time required for the sound pulses to traverse the path 18 and the frequency of these pulses is a measure of this time interval. The time interval which is equal to the reciprocal of the frequency may be given by the formula $$t_1 = \frac{S_1}{V_s + V_f \cos \theta_1} \quad (1)$$

where $t_1$ is the time required for the sound to travel over the path 18, $S_1$ is the length of this path, $V_s$ is the velocity of the sound through the fluid, $V_f$ the velocity of the fluid and $\theta_1$ the angle of the path 18 as respects the axis of the pipe and hence the fluid flow. In Equation 1 the fluid is assumed to be flowing towards the right against the path of travel of the sound so that the time required for the sound to traverse the path is increased by an amount proportional to the velocity of fluid flow. It will be noted that this equation contains the term $V_s$, the velocity of sound through the fluid and hence a measurement of time or its reciprocal, namely, the frequency of the signal generated in this single path will not give an indication which is divorced from this undesirable variable.

In order that this term may be eliminated a second feedback path similar to the first is provided but in a reverse direction, the sound being projected in the general direction of the fluid flow. This path includes the crystal or magnetostrictive transducer 14 acting when electrically excited to oscillate at a predetermined supersonic frequency and to project sound waves at this frequency directionally towards a receiver 16 along the path indicated by the dotted line 22. These signals are amplified by the amplifier 23 and used to trigger an oscillator or impulse regenerator in the same manner as described above. There will be then a signal generated by the oscillator 24 whose frequency is a function of the time required for the sound pulses to be transmitted along the path 22 and in this case the time required for traverse of this path may be expressed as follows:

$$t_2 = \frac{S_2}{V_s - V_f \cos \theta_2} \quad (2)$$

where $V_s$ and $V_f$ are as given in connection with Equation 1, $S_2$ is the length of the path 22 and $\theta_2$ is the angle that path 22 makes with the axis of the conduit. In this case the time is less than that required for transmission through a stationary fluid by an amount proportional to the velocity of the fluid since the sound is traveling in a path aided by the fluid flow, hence the negative sign appears in denominator of the equation.

Signals are derived from the oscillators 21 and 24 and these signals are impressed on the input of a coincidence mixer 26 to obtain a difference or beat frequency signal. Where signals of a generally square wave form are generated by the oscillators 21 and 24 in a manner as will be described later, the mixer may be any of the well-known coincidence circuits which permit an output pulse to occur only when signals are simultaneously applied to both inputs. By this means the output of the mixer produces a signal which, since it occurs at periods of time that the signals produced by the oscillators 21 and 24 are in phase with each other constitutes the beat frequency or difference frequency of these two signals. This signal which may be filtered to pass only the low frequency beat signal is impressed on a frequency meter 27 which may be of any of the well-known types which produce an indication proportional to the frequency of the signal impressed thereon.

The signal frequency impressed thereon and hence the output indication constitutes the difference of the reciprocals of Equations 1 and 2 which may be expressed as follows:

$$\Delta f + \frac{S_2 V_s + S_2 V_f \cos \theta_1 - S_1 V_s + V_f S_1 \cos \theta_2}{S_1 S_2} \quad (3)$$

If $S_1$ and $S_2$ are made equal to S and $\theta_1$ and $\theta_2$ equal to $\theta$ this equation may be simplified to:

$$\Delta f = \frac{2 V_f \cos \theta}{S} \quad (4)$$

Hence the difference frequency and the frequency meter indication varies only as the single variable whose value is desired to be made known, i. e. the velocity of the fluid $V_f$.

Figure 2:
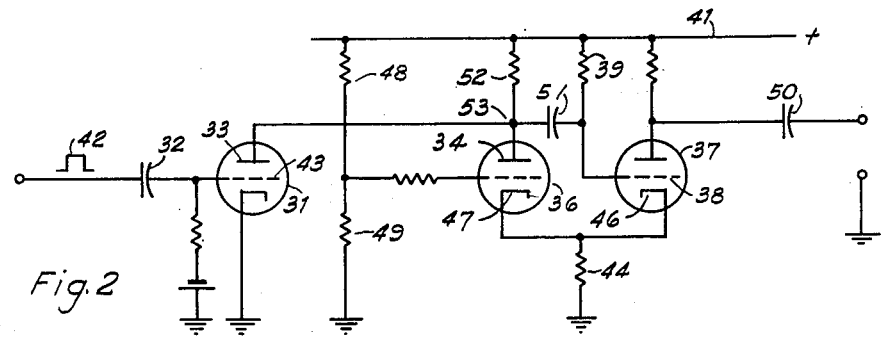
Figure 2 is a schematic diagram of an oscillator which may be used.

An impulse regenerator of the type depicted in Fig. 2 may be advantageously used for the oscillators 21 and 24 of Fig. 1 so that signals are produced at a repetition frequency determinable in accordance with the time required for the sound waves to traverse paths 18 and 22.

Referring now to Fig. 2 the received signal after being amplified by one of the amplifiers 19 or 23 is impressed on the grid of the tube 31 through a coupling condenser 32. The anode 33 of this tube is connected to the anode 34 of a tube 36 which forms one of a pair of tubes of a multivibrator, the remaining portion of which includes the tube 37. In the normal or stable condition of operation the tube 36 is biased below cutoff, the grid thereof being supplied by a fixed potential from the dividing circuit consisting of resistors 48 and 49 while the cathode is maintained at a positive potential as respects ground by reason of the plate current flowing in tube 37 and through the common cathode resistor 44, the tube 37 being biased for conduction therethrough and grid current being permitted to flow through resistor 39.

The anodes 33 and 34 of tubes 31 and 36 are connected together and to the positive source of supply, indicated by the conductor 41, through a common anode resistor 52. The common anode terminal of this resistor is connected to the grid 38 of the tube 37 through a condenser 51, so that signals appearing in the output of either tube are impressed on the grid 38.

When a positive pulse such as the square wave signal 42 is impressed on the grid 43 of the tube 31, this signal is inverted by the tube and a negative signal is impressed on the grid 38 of the tube 37 through the condenser 51. This causes a reduction in the anode current in this tube which, since the current through the common cathode resistor 44 is reduced, results in a decrease in potential of the cathode 47 and the bias between the grid and cathode of the tube 36 becomes such as to permit current to flow in the anode circuit of this tube. Such a current flow reduces the potential of the terminal 53 which results in a further increase in the negative signal applied to the grid 38 of the tube 37 so that the action of both tubes 36 and 37 reenforces each other and tube 37 is abruptly cut off while tube 36 is made conductive.

This is an unstable condition of operation, however, and lasts for only a short interval of time determined by the time constant of the circuit comprising condenser 51 and resistor 39. During this period current flows through the resistor 39 charging the condenser 51 and causing the grid 38 to rise towards its former value. As soon as the grid 38 reaches such a value that current is permitted to flow in tube 37, the potential of the cathode 47 of tube 36 is increased and the current flow through the tube 36 is decreased. This results in a further increase in potential of the grid 38 due to its connection to the anode circuit of the tube 36 and opposite reenforcing action between the tubes 36 and 37 takes place causing the tube 36 to abruptly cut off and the tube 37 to become conductive and remain in such a condition until another pulse is impressed on the input of the tube 31 when the action above described is repeated.

Short positive pulses are therefore generated at each instant that a pulse is impressed on the input of the circuit and these pulses may be derived from the output circuit through the coupling condenser 50 and when fed back through the circuit of Fig. 1, result in a periodicity or frequency of generation directly dependent on the time required for transmission through the fluid path.

Figure 3:
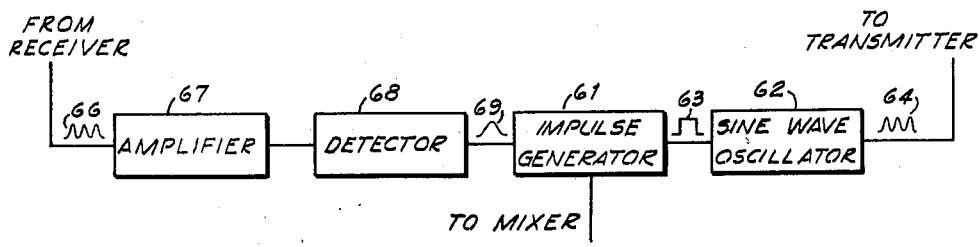
Figure 3 is a schematic block diagram of a modified form of feedback circuit which may be substituted for the feedback circuits of the system of Fig. 1.

In Fig. 3 there is disclosed a modified form of feedback circuit which may be advantageously used in place of the feedback circuits of Fig. 1, only one such feedback circuit being illustrated since as is readily apparent both circuits when used are duplicates as far as structural elements are concerned.

In the modification of Fig. 3 the transmitter is excited by a pulse signal whose frequency of oscillation is substantially that of the frequency of the transmitter rather than depending on merely shock excitation of the transmitter to produce the supersonic vibrations as in the form of Fig. 1.

To this end an impulse regenerator 61 which may be of the type disclosed in Fig. 2 energizes or triggers a sine wave oscillator 62 by the substantially square wave pulse 63 produced by the impulse generator in response to received signals.

The sine wave oscillator 62 may be any of the types as is well known in the art which in response to the triggering pulse received from the impulse generator 61, generates a pulse signal of short time duration and of supersonic frequency. The signal pulse of supersonic frequency as illustrated at 64 energizes the transmitter which by reason thereof projects a narrow beam of supersonic sound towards the receiver. The receiver in turn reconverts the sound to an electrical pulse signal illustrated at 66 and this pulse is amplified by the amplifier 67 and demodulated by the detector 68 to produce a pulse 69 which in turn when impressed on the impulse regenerator 61 causes the device to regenerate a new pulse signal 63.

Pulse envelope signals are, therefore, regenerated and retransmitted at a rate or periodicity dependent on the time required for the sound waves to travel through the fluid stream.

Two such feedback circuits are used as in the system of Fig. 1, the sound waves being caused to be projected in different directions through the fluid stream and a beat frequency signal is obtained by mixing the signals generated in each path so that the velocity of fluid flow may be determined by suitable indicating means.

The term fluid as used herein is intended to have its usual dictionary meaning, namely, to include both gas and liquid flow. It being readily apparent to one skilled in the art that the flow of either gas or liquid is susceptible to measurement by such a system, the only requirement being that the supersonic frequency of transmission in either fluid must be appropriate for proper directional projection through the selected medium.

What is claimed is:

1. A flow meter comprising a first supersonic transmitter and a first receiver located at such spaced points in a fluid stream that signals are transmitted through said stream from said transmitter to said receiver in a direction generally upstream of said fluid flow, a first feedback path including an amplifier coupling the output of said receiver to the input of said transmitter, a second transmitter and a second receiver located at such spaced points in said fluid stream that signals are transmitted through said stream from said second transmitter to said second receiver in a direction generally downstream of said fluid flow, a second feedback path including an amplifier coupling the output of said second receiver to the input of said second transmitter, means in said first feedback path for deriving a signal therefrom, means in said second feedback path for deriving a signal therefrom, means for obtaining the beat frequency of said derived signals and indicator means operative by said beat frequency signal.

2. A flow meter for measuring the velocity of fluid flow in a fluid stream comprising, a first supersonic transmitter, a first supersonic receiver located at a predetermined distance upstream from said transmitter, the signals generated by excitation of said transmitter being directed through said fluid stream towards said receiver, a second supersonic transmitter, a second supersonic receiver located at a predetermined distance downstream from said second transmitter, the signals generated by excitation of said second transmitter being directed through said fluid stream towards said second receiver, a first feedback path connecting the output of said first receiver to the input of said first transmitter, said feedback path including means for energizing said first transmitter in timed relation with the signals received by said first receiver whereby signals are generated in said first feedback path which have a frequency determined by the time required for transmission through said fluid stream from said first transmitter to said first receiver, a second feedback path connecting the output of said second receiver to the input of said second transmitter, said second feedback path including means for energizing said second transmitter in timed relation with the signals received by said second receiver whereby signals are generated in said second feedback path which have a frequency determine by the time required for transmission through said fluid stream from said second transmitter to said second receiver, means for obtaining a beat frequency signal from the signals generated by said first and second feedback paths, and an indicator operative in accordance with the frequency of said beat frequency signal.

3. A flow meter for measuring the velocity of fluid flow in a fluid stream comprising, a first supersonic transmitter and a first supersonic receiver located at predetermined spaced points in said fluid stream, said receiver being upstream relative to said transmitter, a second supersonic transmitter and a second supersonic receiver located at predetermined spaced points in said fluid stream, said second receiver being downstream relative to said second transmitter, a first feedback path connected between said first receiver and said first transmitter, said feedback path including a first regenerating pulse oscillator which generates an output pulse in response to a received pulse impressed on its input, a second feedback path connected between said second receiver and said second transmitter, said second feedback path including a second regenerating pulse oscillator which generates an output pulse in response to a received pulse impressed on its input, means for obtaining a beat frequency signal from the signals generated by said first and second regenerating pulse oscillators, and an indicator operated by said beat frequency signal.

4. A flow meter for measuring the velocity of fluid flow in a fluid stream comprising, a first supersonic transmitter and a first supersonic receiver located at predetermined spaced points in said fluid stream, said receiver being upstream relative to said transmitter, a second supersonic transmitter and a second supersonic receiver located at predetermined spaced points in said fluid stream, said second supersonic receiver being downstream relative to said second transmitter, a first feedback path connected between said first receiver and said first transmitter, a second feedback path connected between said second receiver and said second transmitter, each of said feedback paths including a regenerative pulse oscillator, having its input connected in circuit with a respective one of said receivers, and a sine-wave oscillator triggered by the signal generated by a respective one of said regenerative pulse oscillators, means for obtaining a beat frequency from signals generated in said first and second feedback paths and an indicator operated by said beat frequency signal.

5. A flow meter in accordance with claim 4 in which each of said feedback paths additionally includes an amplifier and a detector connected between the output of a respective receiver and the input of a respective regenerative pulse oscillator.

6. A flow meter for measuring the velocity of fluid flow in a fluid stream comprising, first and second transmitters and first and second receivers located in said fluid stream, said first transmitter and said first receiver being spaced apart by a predetermined distance and so located with respect to each other that the direction of transmission therebetween has at least a component in the direction of fluid flow, said second transmitter and said second receiver being spaced apart by said predetermined distance and so located with respect to each other that the direction of transmission therebetween has at least a component opposite to the direction of fluid flow, a first feedback path connected between said first receiver and said first transmitter, a second feedback path connected between said second receiver and said second transmitter, means in each of said feedback paths for deriving respective signals therefrom, means for obtaining a beat frequency signal from the signals so derived and an indicator operated by said beat frequency signal.

7. A flow meter for measuring the velocity of fluid flow in a fluid stream comprising, first and second transmitters and first and second receivers located in said fluid stream, said first transmitter and said first receiver being spaced apart by a predetermined distance and so located with respect to each other that the direction of transmission therebetween has at least a component in the direction of fluid flow, said second transmitter and said second receiver being spaced apart by said predetermined distance and so located with respect to each other that the direction of transmission therebetween has at least a component opposite to the direction of fluid flow, a first feedback path connected between said first receiver and said first transmitter, a second feedback path connected between said second receiver and said second transmitter, each of said feedback paths including a regenerative pulse oscillator having its input connected in circuit with a respective one of said receivers and its output connected in circuit with a respective one of said transmitters, means for obtaining a beat frequency signal from the signals generated by said regenerative pulse oscillators and an indicator operated by said frequency signal.

8. A flow meter for measuring the velocity of fluid flow in a fluid stream comprising, first and second transmitters and first and second receivers located in said fluid stream, said first transmitter and said first receiver being spaced apart by a predetermined distance and so located with respect to each other that the direction of transmission therebetween has at least a component in the direction of fluid flow, said second transmitter and said second receiver being spaced apart by said predetermined distance and so located with respect to each other that the direction of transmission therebetween has at least a component opposite to the direction of fluid flow, a first feedback path connected between said first receiver and said first transmitter, a second feedback path connected between said second receiver and said second transmitter, each of said feedback paths including a regenerative pulse oscillator and a sine wave oscillator, each of said pulse oscillators having its input connected in circuit with a respective one of said receivers and its output connected to trigger a respective sine wave oscillator, the output of the sine wave oscillators being connected to energize a respective one of said transmitters, means for obtaining a beat frequency signal from the signals generated in each of said feedback paths and an indicator operated by said beat frequency signal.

9. A flow meter in accordance with claim 8 in which each of said feedback paths additionally includes an amplifier and a detector connected between the output of a respective receiver and the input of a respective regenerative pulse oscillator.

RAYMOND L. GARMAN.
MARCEL E. DROZ.
JOHN W. GRAY.

References Cited in the file of this patent

UNITED STATES PATENTS

| Number | Name | Date |
| --- | --- | --- |
| 1,636,502 | Fessenden | July 19, 1927 |
| 1,864,638 | Chilowsky | June 28, 1932 |
| 1,881,543 | Hartig et al. | Oct. 11, 1932 |
| 2,015,933 | Hartig | Oct. 1, 1935 |
| 2,151,203 | Hartig | Mar. 21, 1939 |
| 2,328,546 | Cafarelli | Sept. 7, 1943 |